US009079487B2

(12) United States Patent
Maier et al.

(10) Patent No.: US 9,079,487 B2
(45) Date of Patent: Jul. 14, 2015

(54) DEVICE FOR OPERATING A DRIVE UNIT OF A MOTOR VEHICLE

(75) Inventors: Ruben Maier, Herbrechtingen (DE); Alexander Kruse, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 13/642,056

(22) PCT Filed: Apr. 15, 2011

(86) PCT No.: PCT/EP2011/001917
§ 371 (c)(1),
(2), (4) Date: Oct. 18, 2012

(87) PCT Pub. No.: WO2011/131320
PCT Pub. Date: Oct. 27, 2011

(65) Prior Publication Data
US 2013/0035838 A1 Feb. 7, 2013

(30) Foreign Application Priority Data

Apr. 19, 2010 (DE) .......................... 10 2010 015 425

(51) Int. Cl.
G06F 17/00 (2006.01)
B60K 6/52 (2007.10)
B60K 6/48 (2007.10)
B60W 30/20 (2006.01)

(52) U.S. Cl.
CPC ... B60K 6/52 (2013.01); B60K 6/48 (2013.01); B60W 30/20 (2013.01); B60L 2240/423 (2013.01); B60W 2710/0666 (2013.01); B60W 2710/083 (2013.01); Y02T 10/6221 (2013.01); Y02T 10/6265 (2013.01); Y02T 10/642 (2013.01)

(58) Field of Classification Search
USPC ............................................................ 701/99
See application file for complete search history.

(56) References Cited

U.S. PATENT DOCUMENTS

| RE31,981 | E | * | 9/1985 | Lindbert ....................... 180/247 |
| 4,714,271 | A | * | 12/1987 | Buma et al. ................ 280/5.503 |
| 4,717,173 | A | * | 1/1988 | Sugasawa et al. .......... 280/5.518 |
| 4,765,648 | A | * | 8/1988 | Mander et al. ............. 280/5.519 |

(Continued)

FOREIGN PATENT DOCUMENTS

| DE | 100 47 076 | 4/2002 |
| DE | 102005012931 | 9/2006 |

(Continued)

OTHER PUBLICATIONS

Jp2007-161032a1 translation of paragraph 45-53.*

Primary Examiner — Stefanos Karmis
Assistant Examiner — Michael E Butler
(74) Attorney, Agent, or Firm — Henry M. Feiereisen LLC.

(57) ABSTRACT

A device for operating a drive unit generates setpoint values for controlling the drive unit based on, for example driver-generated input parameters. The device generates a first setpoint value for a front-axle drive and a second setpoint value for a rear-axle drive and includes a load impact damping unit which, in the event of a risk of load impacts, processes the setpoint values so as to damp the load impacts. The load impact damping unit is divided into a first load impact damping filter for processing the first setpoint value for the front axle drive and into a second load impact damping filter for processing the second setpoint value for the rear axle drive, and supplies corresponding filtered setpoint values to these drives.

9 Claims, 3 Drawing Sheets

(56) References Cited

U.S. PATENT DOCUMENTS

| | | | |
|---|---|---|---|
| 4,826,205 A * | 5/1989 | Kouda et al. | 280/5.501 |
| 4,886,291 A * | 12/1989 | Okamoto | 280/5.501 |
| 5,015,007 A * | 5/1991 | Uchiyama et al. | 280/5.514 |
| 5,412,475 A * | 5/1995 | Smith et al. | 356/467 |
| 6,412,788 B1 * | 7/2002 | Ichimaru | 280/5.519 |
| 8,217,774 B2 | 7/2012 | Elias et al. | |
| 2005/0143847 A1 * | 6/2005 | Papiernik | 700/61 |
| 2006/0124374 A1 * | 6/2006 | Katada et al. | 180/233 |
| 2006/0267750 A1 * | 11/2006 | Lu et al. | 340/440 |
| 2007/0067085 A1 * | 3/2007 | Lu et al. | 701/70 |
| 2007/0188021 A1 * | 8/2007 | Maki et al. | 303/186 |
| 2008/0029987 A1 * | 2/2008 | Sugiyama | 280/124.106 |
| 2008/0195289 A1 * | 8/2008 | Sokoll | 701/70 |
| 2008/0319608 A1 * | 12/2008 | Pothin | 701/38 |
| 2009/0062984 A1 * | 3/2009 | Poilbout | 701/37 |
| 2009/0192674 A1 * | 7/2009 | Simons | 701/37 |
| 2009/0254251 A1 * | 10/2009 | Sato | 701/41 |
| 2009/0319128 A1 * | 12/2009 | Lauer et al. | 701/42 |
| 2010/0094510 A1 * | 4/2010 | Lu et al. | 701/45 |
| 2010/0167869 A1 * | 7/2010 | Falkenstein et al. | 477/3 |
| 2010/0250056 A1 * | 9/2010 | Perkins | 701/35 |
| 2011/0172886 A1 * | 7/2011 | Taira et al. | 701/49 |
| 2011/0202235 A1 * | 8/2011 | Oikawa | 701/36 |
| 2012/0022730 A1 * | 1/2012 | Maass et al. | 701/22 |
| 2012/0267179 A1 * | 10/2012 | Viengchai | 180/65.265 |

FOREIGN PATENT DOCUMENTS

| | | | | |
|---|---|---|---|---|
| DE | 102006039400 | | 3/2008 | |
| DE | 102007013253 | | 9/2008 | |
| DE | 102007023164 | | 11/2008 | |
| DE | 102007023164 A1 * | 11/2008 | | B60W 20/00 |
| DE | 102008041693 | | 3/2010 | |
| FR | 2 901 747 | | 12/2007 | |
| JP | 2007-161032 A1 * | 6/2007 | | B60K 41/00 |

* cited by examiner

DEVICE FOR OPERATING A DRIVE UNIT OF A MOTOR VEHICLE

CROSS-REFERENCES TO RELATED APPLICATIONS

This application is the U.S. National Stage of International Application No. PCT/EP2011/001917, filed Apr. 15, 2011, which designated the U.S. and has been published as International Publication No. WO 2011/131320 and which claims the priority of German Patent Application, Ser. No. 10 2010 015 425.3, filed Apr. 19, 2010, pursuant to 35 U.S.C. 119(a)-(d).

BACKGROUND OF THE INVENTION

The invention relates to a device for operating a drive unit of a motor vehicle and a method for operating a motor vehicle.

In vehicles with internal combustion engines as well as in vehicles having an exclusive or a partial electric drive, strong driver-generated torque jumps can cause vibrations in the drive train, also referred to as load reversals or load impacts, which can be perceived as an uncomfortable driving characteristic. This applies in particular to torque jumps between an operating phase without torque demand, i,e. a coasting mode, and an operational phase with torque demand, i.e., a traction mode.

DE 10 2007 013 253 A1 discloses a generic device for operating a drive unit of a motor vehicle. The device generates setpoints based on driver-generated input parameters, which are used for controlling the drive unit. The drive unit is in the present case an internal combustion engine and an electric machine. The device recognizes operating conditions having a risk of load impacts. The device hereby processes the setpoints so as to attenuate the load impacts.

Such load impact damping is problematic especially for vehicles with a front axle drive and a rear axle drive that is mechanically decoupled from the front axle drive. In such drive system, the front axle drive and the rear axle drive can respond to jumps in the setpoint torque with different dynamics. When the front axle and the rear axle drive respond differently, the load impact damping on the front axle and at the rear axle may not be matched, resulting in an uncomfortable driving sensation.

It is the object of the invention to provide a device and a method for operating a drive unit of a motor vehicle, wherein impact damping which is comfortable for the vehicle occupant is feasible, in particular in vehicles having front axle drive and rear axle drive.

SUMMARY OF THE INVENTION

The device of the invention is used in a vehicle having a front axle drive and a rear axle drive. The device of the invention generates, in response to the input parameters set by the driver, a first setpoint value and/or a first setpoint torque for the front axle drive and a second setpoint value and/or a second setpoint torque for the rear axle drive.

According to the invention, a central load impact damping unit is not provided; instead, a first load impact damping filter associated with the front axle drive, and a second load impact damping filter associated with the rear axle drive are provided. The first load impact damping filter can then modulate the first setpoint torque supplied to the front axle drive, whereas the second load impact damping can modulate the setpoint torque supplied to the rear axle drive.

The setpoint torque is intended to include all setpoints suitable for deriving therefrom wheel or axle torques. A drive power or a value derived from the drive power is mentioned here as an example.

Based on the first load impact damping filter and the second impact damping filter operating independent from the first load impact damping filter, mutually independent load impact damping interventions on the front axle or on the rear axle may be performed. Thus, for example, vehicle load impact damping may be performed on one of the two vehicle axes, whereas the other vehicle axle does not have load impact damping. Alternatively, the load impact damping on the front axle may have a time offset with respect to the load impact damping on the rear axle in order to attain certain driving characteristics.

The first and the second load impact damping filter have at least one detection member or separate, independently operating detection members which recognize whether a load impact risk exists for the front axle or for the rear axle. Such load impact risk results, for example, when a load on the front or rear axle drive changes between coasting and a traction mode. Alternatively or in addition, a load impact risk may occur for larger jumps in the setpoint torque, when the driver suddenly sets a high torque demand.

The first and second load impact damping filter may also include a respective modulation member configured to modulate the setpoint torque set by the driver with respect to damping of the load impact. In the case of the aforementioned load change between the traction mode and the coasting mode, the torque gradient can be reduced in the region of a zero crossing of the torque. This can be done, for example, by impressing a second degree parabola on the torque jump in the region of the zero-crossing of the torque.

In the event that the detection member does not detect load impact risk, the setpoint torque can bypass the modulation member and can be supplied without modulation to the front axle drive or to the rear axle drive.

The present invention can be employed in particular in vehicles with a front axle drive and rear axle drive which are mutually independent and mechanically decoupled. In this case, the front axle and the rear axle cannot be driven by a common drive train, but are instead driven independent of one another by the two aforementioned axle drives.

The term axle drive hereby refers to an internal combustion engine and/or an electric machine. The internal combustion engines and electric machines can be provided here as an axle drive either alternatively or in combination. For example, the front axle drive may be realized with an internal combustion engine and an electric machine. The rear axle drive may have an additional electric machine independent from the front axle drive. Alternatively, the axle drive may have a combination of an internal combustion engine and an electric machine or a combination of two electric machines. The front axle drive and the rear axle drive are hereby controlled not by a common drive train, but instead by separate drive trains.

Based on the aforementioned input parameters, the device may first determine a sum torque that can be supplied to a torque distribution unit. The torque distribution unit splits the sum torque in response to, for example, a driver assistance control, for example an all-wheel control, of a vehicle dynamics control or a vehicle cruise control and the like into the aforementioned first setpoint torque for the front axle drive and the second setpoint torque for the rear axle drive.

As already mentioned above, the front axle drive and the rear axle drive may have different engines/machines, i.e. internal combustion engines or electric machines, which may result in a different temporal response of the front axle drive and the rear axle drive for set setpoint torques. Against this background, it is important for a smooth driving characteristic that the separately performed load impact damping on the front axle and the rear axle are coordinated with each other.

To this end, at least one timing element may be associated with the first and second load impact damping filter. A time offset which takes into account the different temporal response of the front axle and the rear axle can be defined with the timing element. The time delay may be defined such that the load impact damping occurs simultaneously at the front axle and at the rear axle, Alternatively, the time offset may be defined such that the load impact damping occurs both on the front axle and on the rear axle at different times with a mutual time delay. In this way, a particular driving characteristic desired by the driver may optionally be set, for example during a sports mode.

BRIEF DESCRIPTION OF THE DRAWING

An exemplary embodiment of the invention will now be described with reference to the accompanying figures.

These show in.

DETAILED DESCRIPTION OF PREFERRED EMBODIMENTS

Figure 1:
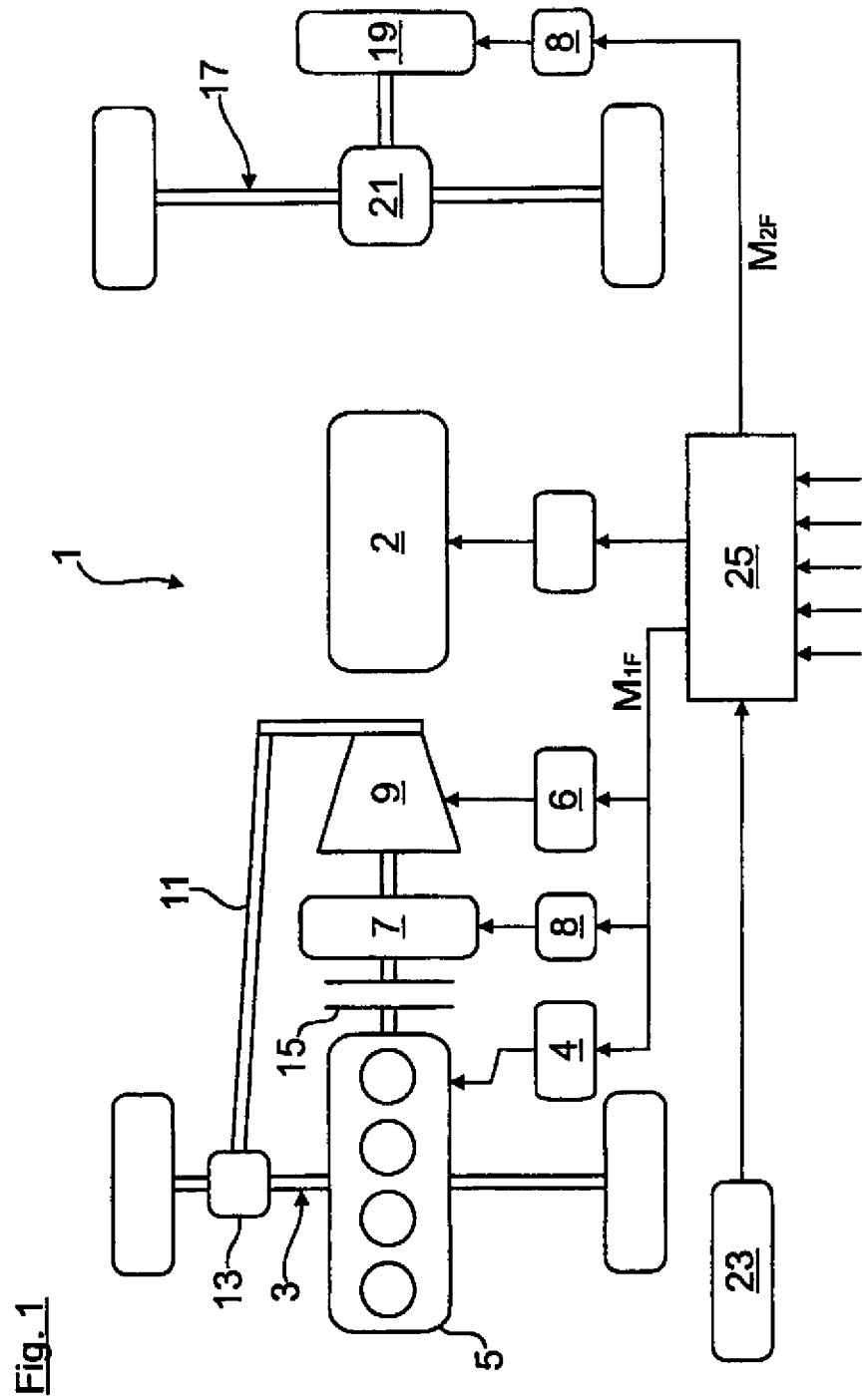
FIG. 1 in a schematic diagram a drive system of a motor vehicle.

FIG. 1 shows in a schematic diagram the drive system of a hybrid vehicle with an all-wheel drive unit 1. An internal combustion engine 5 and an electric machine 7 are connected to a drive train on the front axle of the vehicle 3 and cooperate with a gear 9. The gear 9 is drivingly connected with the front axle 3 via a transmission output shaft 11 and a schematically indicated axle differential 13. A clutch 15, which is disengaged or engaged depending on the driving situation, is connected between the internal combustion engine 5 and the electric machine 7.

An additional electric machine 19, which drives the two rear wheels of the vehicle via an axle differential 21, is arranged on the rear axle 17 of the motor vehicle.

Insofar as it is necessary for an understanding of the invention, the front-axle drive composed of the internal combustion engine 5 and the electric machine 7 and the rear axle drive composed of the electric machine 19 are indicated in FIG. 1. Other drive components, for example the high voltage battery 2 for supplying power to the two electric machines 7, 19, or the engine controller 4, the transmission controller 6 or the power electronics 8 of the two electric machines 7, 19 are only roughly sketched without further description for sake of clarity.

According to FIG. 1, an accelerator pedal module 23 is thus in signal communication with a central controller 25. The central controller 25 additionally detects a plurality of input parameters, which will not be described here in detail, wherein the front axle drive 5, 7 can be controlled with a first filtered setpoint torque $M_{1F}$ and the rear axle drive 19 can be controlled with a second setpoint torque $M_{2F}$ based on a torque desired by the driver transmitted from the pedal module 23 and based on these input parameters.

Figure 2:
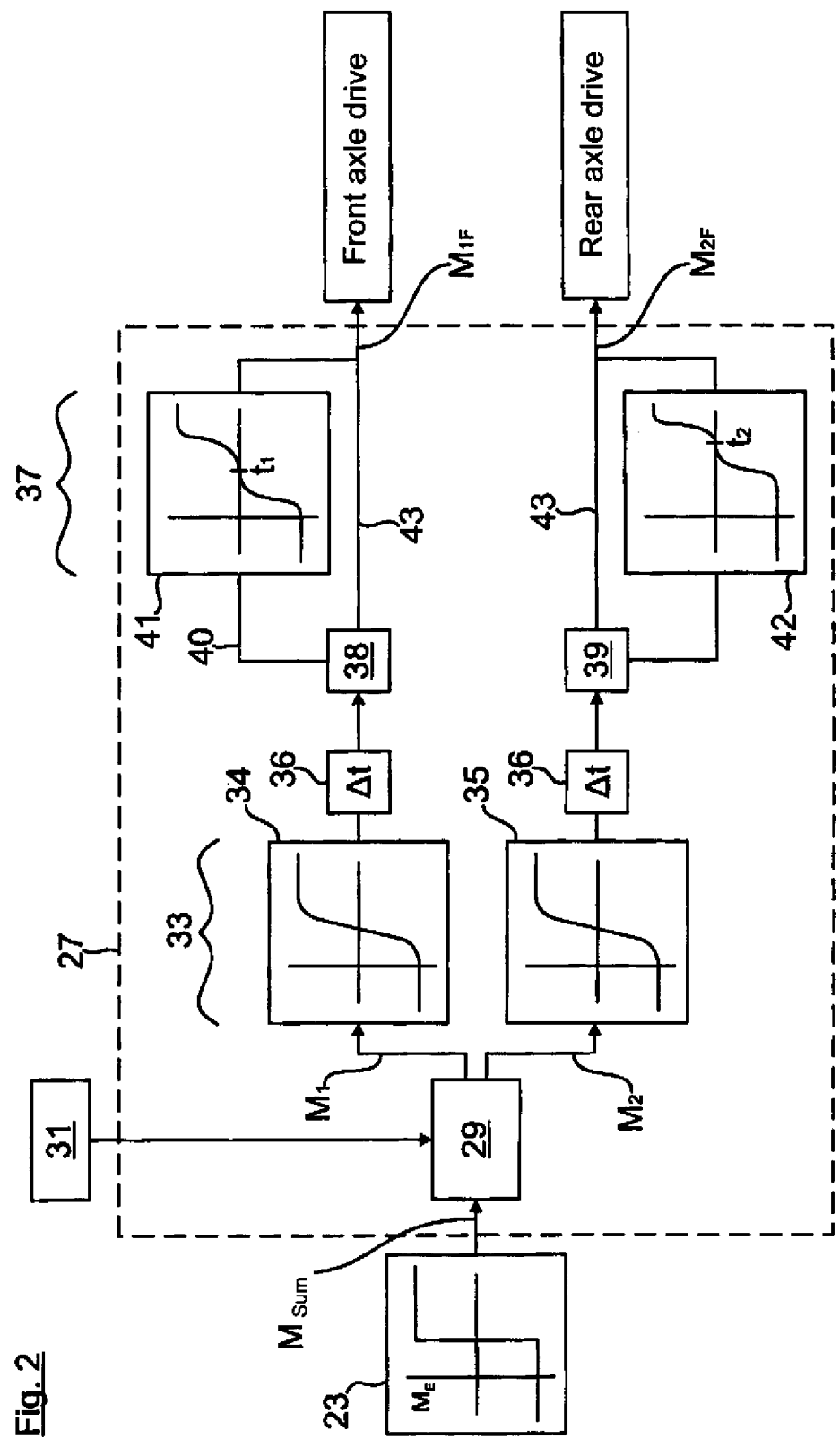
FIG. 2 a block circuit diagram showing, starting from a torque set by the driver, signal processing until a filtered setpoint torque for the front axle drive and a filtered setpoint torque for the rear axle drive are produced, and FIG. 3 a torque-time diagram showing a jump in the setpoint torque set by the driver and profiles of the setpoint torque for the front axle drive and the rear axle drive modulated with respect to load impact damping.

The signal path necessary for an understanding the invention between the pedal module and the front axle drive 5, 7 and the rear axle drive 19 is shown in simplified form in FIG. 2. Accordingly, a desired driver value is supplied from the pedal module 23 to a device 27 integrated in the controller 25 as a setpoint. This setpoint includes a torque, a power or a quantity derived from the torque or the power. In the present example, the setpoint corresponds to a sum torque $M_{Sum}$ that is supplied to a distribution unit 29 of the device 27. The torque distribution unit 29 splits the sum torque $M_{Sum}$ as a function of generally known input parameters into a setpoint torque $M_1$ for the front axle drive 5, 7 and a setpoint torque $M_2$ for the rear axle drive 19. The sum torque $M_{Sum}$ is split according to FIG. 2 by taking into consideration a driver assistance controller 31.

According to FIG. 2, the signals from the setpoint torques $M_1$, $M_2$ split by the torque distribution unit 29 are further processed in mutually independent parallel processing paths, wherein the setpoint torques $M_1$, $M_2$ can be filtered in a low-pass filter unit 33 and in a load impact damping unit 37, so that correspondingly filtered setpoint torques $M_{1F}$, $M_{2F}$ are forwarded to the front axle drive 5, 7 and to the rear axle drive 19.

In the device 27 shown in FIG. 2, the processing paths for filtering the setpoint torques $M_1$, $M_2$ are constructed identically, by way of example. The following discussion will therefore be limited to the signal processing of the setpoint torque $M_1$ supplied to the front axle 5, 7. The setpoint torque $M_1$ is initially supplied to a first low-pass filter 34 of the low-pass filter unit 33. The low-pass filter 34 may be, for example, a time-proportional element with a temporal characteristic such that, for example, a driver-generated input step function can be smoothed, as will be described further below.

In the further signal path, the setpoint torque $M_1$ is supplied to a timing element 36, from which the setpoint torque $M_1$ is optionally forwarded only following a time delay. The load impact damping unit 37 is arranged downstream of the timing element 36 in the direction of the signal flow.

The load impact damping unit 37 includes first a detection unit 38, from which a bypass signal line 40 with a switched load impact damping filter 41 and a main line 43 branch off. It is then determined in the detection unit 38 whether a load impact risk exists for the front axle 3. Such load impact risk may occur, for example, during a load change of the front axle drive 5, 7 or the rear axle drive 19 when transitioning from a coasting mode to a traction mode.

The main line 43 downstream of the detection unit 38 bypasses the load impact damping filter 41, with the bypass signal line 40 being returned to the main line 43 after the load impact damping filter 41. The main line 43 is further in signal communication with the front axle drive 5, 7, which is controlled by the setpoint torque $M_{1F}$ filtered in the low-pass filter unit 33 and in the load impact damping unit 37.

In accordance with the FIG. 2, the signal path of the setpoint torque $M_2$ from the torque distribution unit 29 towards the rear axle drive 19 is implemented identical to the aforedescribed signal path of the setpoint torque $M_1$.

Figure 3:
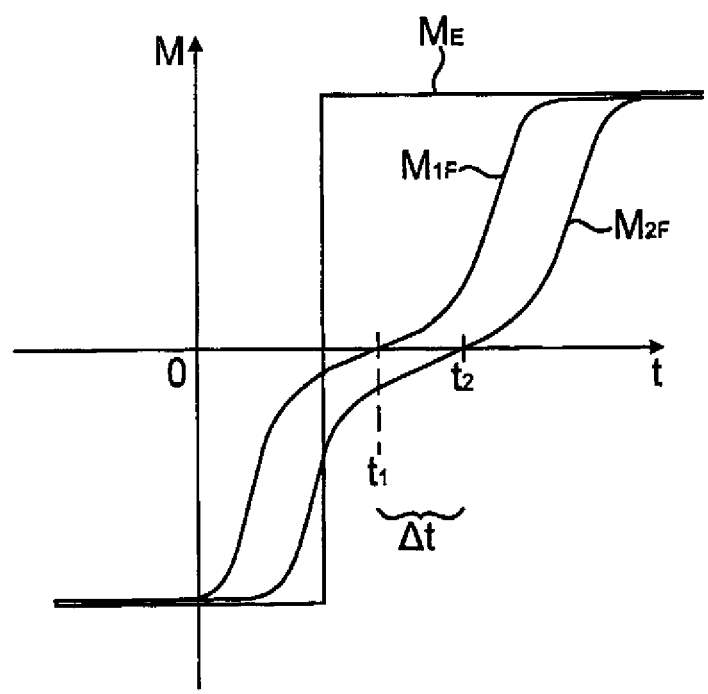

An exemplary driving situation is shown in FIGS. 2 and 3, wherein a driver-generated step function is generated by actuation of the accelerator pedal 23. In the illustrated step function, an input torque $M_E$ switches abruptly from a coasting mode without torque demand to a traction mode with torque demand. The step function shown in FIGS. 2 and 3 thus passes through a zero-crossing for the torque, i.e. through the abscissa of the torque-time diagram.

The torque jump specified by the driver is split in the torque distribution unit 29 into the first setpoint torque $M_1$ for the front axle drive 5, 7 and the second setpoint torque $M_2$ for the rear axle drive 19. The two setpoint torques $M_1$, $M_2$ are initially smoothed in the first and second low-pass filters 34, 35. Thereafter, a time delay $\Delta t$ between the torque buildup on the front axle drive 5, 7 and the torque buildup taking place on the rear axle drive 13 can be specified using the timing elements 36. Such a time delay takes into account that the front axle drive 5, 7 has a more sluggish response due to the use of an internal combustion engine 5 compared to the rear axle drive 19, which has exclusively an electric machine.

The time offset At may be designed, when taking into account these differences in the response times, so as to prevent an uncomfortable driving characteristic when the filtered setpoint torques $M_{1F}$, $M_{2F}$ are applied to the front axle drive 5, 7 and the rear axle drive 19.

Furthermore, the detection unit 38, 39 detects whether or not a load impact risk exists. If the detection unit 38, 39 identifies a load impact risk, then a reduced zero-crossing torque gradient can be impressed at the critical instant on the already smoothed setpoint torque jump in load impact damping filter 41, 42. The so-filtered torque jump is then supplied as a filtered setpoint torque $M_{1F}$, $M_{2F}$ to the front axle drive 5, 7 and the rear axle drive 19, respectively.

In another exemplary driving situation, it is assumed that initially an all-wheel intervention does not take place, and that instead the entire sum torque $M_{Sum}$ is supplied from the torque distribution unit 29 to the front axle drive 5, 7 as the first setpoint torque $M_1$. The front axle drive 5, 7 is then in traction mode, whereas the rear axle drive 19 is carried along and thus operates in coasting mode, for example recuperation mode.

When the driver assistance controller 31 detects slip on the front axle 13, the sum torque $M_{Sum}$ is at least partially redistributed by the torque distribution unit 29 to the rear axle 17. This torque redistribution causes a load change from coasting to traction on the rear axle 19, prompting the detection member 39 associated with the rear axle 19 to detect a load impact risk. Accordingly, the setpoint torque $M_2$ redistributed to the rear axle 17 is subjected to load impact damping filtering in the load impact damping filter 42.

In contrast to the rear axle 17, the reduction of the setpoint torque $M_1$ on the front axle 3 may be so small that the detection member 38 associated with the front axle 3 does not detect a load impact risk. Therefore, there is no load impact damping on the front axle 3. In analogy to the aforementioned torque redistribution, torque redistribution from the rear axle 17 to the front axle 3 may also arise in other driving situations. In this situation, load impact damping may only be performed on the front axle 3, whereas the rear axle 17 is driven without load impact damping.

What is claimed is:

1. A device for operating a drive unit of a vehicle, wherein the drive unit separately drives a front axle drive and a rear axle drive that is independent of and mechanically decoupled from the front axle drive, the device comprising a load reversal damping unit configured to receive an input parameter representing a requested torque jump and to generate—based on the input parameter—a first torque setpoint value associated with the front axle drive and a second torque setpoint value associated with the rear axle drive, wherein the load reversal damping unit is divided into a first load reversal damping filter for provessing the first torque setpoint value and supplying a filtered first torque setpoint value as a first wheel or axle torque to the front axle drive and a second load reversal damping filter for independently processing the second torque setpoint value and supplying a filtered second torque setpoint value as a second wheel or axle torque to the rear axle drive, wherein each of the fist and the second load reversal damping filters comprises at least one detection member which detects whether a load reversal risk exists for at least one of the front axle and the rear axle, the load reversal damping unit further comprising at least one timing element configured to produce a time offset between a torque buildup on the front axle drive based on the filtered first torque setpoint value and a torque buildup on the rear axle drive based on the filtered second torque setpoint value.

2. The device of claim 1, wherein the input parameter is based on a driver-generated input parameter.

3. The device of claim 1, wherein each of the first and the second load impact damping filters comprises a corresponding modulation device which processes at least one of the first and second torque setpoint value when a load impact risk exists in relation to at least one of the front axle and the rear axle.

4. The device of claim 1, further comprising a torque distribution unit arranged upstream of the first and second load reversal damping filters, which splits a sum torque into a setpoint torque for the front axle drive and a setpoint torque for the rear axle drive.

5. The device of claim 4, wherein The torque distribution unit splits the generated first and second torque setpoint values in response to the input parameter supplied by at least one of a driver assistance control, an all-wheel control, a vehicle dynamics control and a vehicle cruise control.

6. The device of claim 1, wherein the front axle drive and the rear axle drive each have a different temporal response, wherein the time offset is selected such that the load impact damping on the front axle and the load impact damping on the rear axle are matched to one another.

7. The device of claim 6, wherein the time offset is selected such that the load impact damping on the front axle and the load impact damping on the rear axle occur simultaneously.

8. The device of claim 1, wherein the front axle drive and the rear axle drive each comprise at least one machine selected from an electric machine and an internal combustion engine.

9. The device of claim 1, wherein the at least one detection member is configured to detect a load impact risk when the front axle drive or rear axle drive switches between coasting mode and traction mode.

* * * * *